(12) United States Patent
Lunn et al.

(10) Patent No.: US 8,378,579 B1
(45) Date of Patent: Feb. 19, 2013

(54) BALLAST CIRCUIT FOR A GAS DISCHARGE LAMP WITH A CONTROL LOOP TO REDUCE FILAMENT HEATING VOLTAGE BELOW A MAXIMUM HEATING LEVEL

(75) Inventors: Thomas Lunn, Hazel Green, AL (US); Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 370 days.

(21) Appl. No.: 12/708,168

(22) Filed: Feb. 18, 2010

(51) Int. Cl.
*H05B 41/12* (2006.01)

(52) U.S. Cl. ............ 315/224; 315/49; 315/94; 315/291; 315/294

(58) Field of Classification Search ............... 315/209 R, 315/224, 225, 226, 276, 283, 291, 307, 308
See application file for complete search history.

(56) References Cited

U.S. PATENT DOCUMENTS

| | | | |
|---|---|---|---|
| 4,630,005 A | 12/1986 | Clegg et al. | |
| 5,742,134 A | 4/1998 | Wacyk et al. | |
| 5,744,915 A | 4/1998 | Nilssen | |
| 5,796,215 A | 8/1998 | Parry et al. | |
| 5,859,504 A | 1/1999 | Nerone | |
| 5,880,562 A | 3/1999 | Nakagawa et al. | |
| 5,939,836 A | 8/1999 | Mita et al. | |
| 6,008,593 A | 12/1999 | Ribarich | |
| 6,034,488 A | 3/2000 | Lindauer et al. | |
| 6,211,623 B1 | 4/2001 | Wilhelm et al. | |
| 6,326,740 B1 | 12/2001 | Chang et al. | |
| 6,555,971 B1 | 4/2003 | Lestician | |
| 6,555,972 B1 | 4/2003 | Lestician | |
| 6,750,619 B2 | 6/2004 | Nemirow et al. | |
| 7,187,132 B2 | 3/2007 | Bakre | |
| 2002/0140371 A1 | 10/2002 | Chou et al. | |
| 2006/0132059 A1 | 6/2006 | Tanaka et al. | |
| 2006/0138968 A1* | 6/2006 | Bakre | 315/209 R |
| 2009/0033236 A1* | 2/2009 | Alexandrov | 315/224 |

* cited by examiner

*Primary Examiner* — Douglas W Owens
*Assistant Examiner* — Jonathan Cooper
(74) *Attorney, Agent, or Firm* — Waddey & Patterson, P.C.; Mark J. Patterson; Gary L. Montle

(57) ABSTRACT

A ballast circuit includes a control loop to reduce a filament heating voltage below after the lamp filaments have been pre-heated. A filament cutback circuit includes a filament cut-back inductive component magnetically coupled to the resonant inductive component in the inverter to receive a filament cutback control voltage associated with an AC voltage for powering the lamps. During the pre-heating period, the filament cutback control voltage is not high enough to charge a chargeable component to a switch threshold level. However, during lamp ignition, the filament cutback control voltage is increased and charges the chargeable component to the switch threshold level. This causes a switch device to operate in a conductive switch state and the filament cutback circuit suppresses the pre-heat voltage.

20 Claims, 2 Drawing Sheets

BALLAST CIRCUIT FOR A GAS DISCHARGE LAMP WITH A CONTROL LOOP TO REDUCE FILAMENT HEATING VOLTAGE BELOW A MAXIMUM HEATING LEVEL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Proper heating of lamp filaments helps extend the life of gas discharge lamps. Prior to the ignition of the lamp filaments, a filament heating voltage may warm the lamp filaments and may be necessary to ignite certain types of high impedance gas-discharge lamps, such as T5 fluorescent lamps. Filament heating voltages also maintain lamp filament temperatures if the lamp current gets too low when a lamp is being dimmed.

Ballast circuits are used to power and operate gas-discharge lamps. The ballast circuit may include an inverter with at least one switch device utilized to convert a DC voltage into a pulsed voltage and a resonant circuit that converts the pulsed voltage into the required AC voltage for powering the gas-discharge lamp. A filament heating circuit is coupled to the inverter to transmit the filament heating voltage to the lamp filaments. These filament heating circuits may include filament resonant tanks tuned to receive the filament heating voltage during the pre-heat period and/or when the lamp is being dimmed.

While the filament heating circuits may be designed to provide the appropriate filament heating voltage to the lamp filaments, the electrical components utilized in these filament resonant tanks often have unacceptably large component tolerances. Because a filament resonant tank has such a high Q, this may result in excessively high filament heating voltages.

High impedance gas-discharge lamps, such as T5 lamps, are particularly sensitive to filament heating voltages during lamp operation. Filament heating voltages can cause unbalanced filament currents and over-current problems. Maintaining these filament voltages as low as possible when the lamp is being dimmed reduces these problems.

Prior art circuits do exist for cutting off a filament heating voltage during steady state operation. Unfortunately, these circuits are designed to eliminate the filament heating voltage after the pre-heat period. Thus, these circuits cannot be used during the pre-heat period or when a lamp is being dimmed because they are designed to prevent the filament heating voltage from heating the lamp filaments.

What is needed then is a ballast circuit that is capable of reducing the filament heating voltage below a desired maximum level during the pre-heat period and when the lamp is being dimmed.

BRIEF SUMMARY OF THE INVENTION

This invention is directed to a ballast circuit that reduces a filament heating voltage to the lamp filaments of a gas discharge lamp when the filament heating voltage is at or above a desired maximum voltage level. The ballast circuit is capable of reducing the filament heating voltage during the pre-heat period and/or when the lamp is being dimmed.

The ballast circuit includes an inverter that converts a DC voltage into an AC voltage that powers a gas-discharge lamp. The inverter has inverter switch devices that convert the DC voltage into a pulsed inverter voltage and an inverter resonant circuit that converts the pulsed inverter signal into the AC voltage that powers the gas-discharge lamp. An inverter controller controls the switching frequency of the inverter switch devices and thus the magnitude of the AC voltage. A filament heating component is coupled to the inverter to receive a filament heating voltage. A voltage level of the filament heating voltage may also be adjusted by controlling the switch frequency of the inverter switch devices. The filament heating component may be a filament heating winding in a filament heating transformer that couples the filament heating voltage to the lamp filaments.

The inverter controller includes a feedback terminal that receives an overvoltage control signal and adjusts the switching frequency of the inverter switch devices in accordance with the signal level of the overvoltage control signal. A control loop is operably associated with the filament heating component and the feedback terminal. The control loop includes a voltage regulator that is responsive to the voltage level of the filament heating voltage. When the voltage regulator senses that the voltage level of the filament heating voltage is at or greater than the desired maximum voltage level, the voltage regulator may cause the control loop to generate the overvoltage control signal.

DETAILED DESCRIPTION OF THE INVENTION

Figure 1:
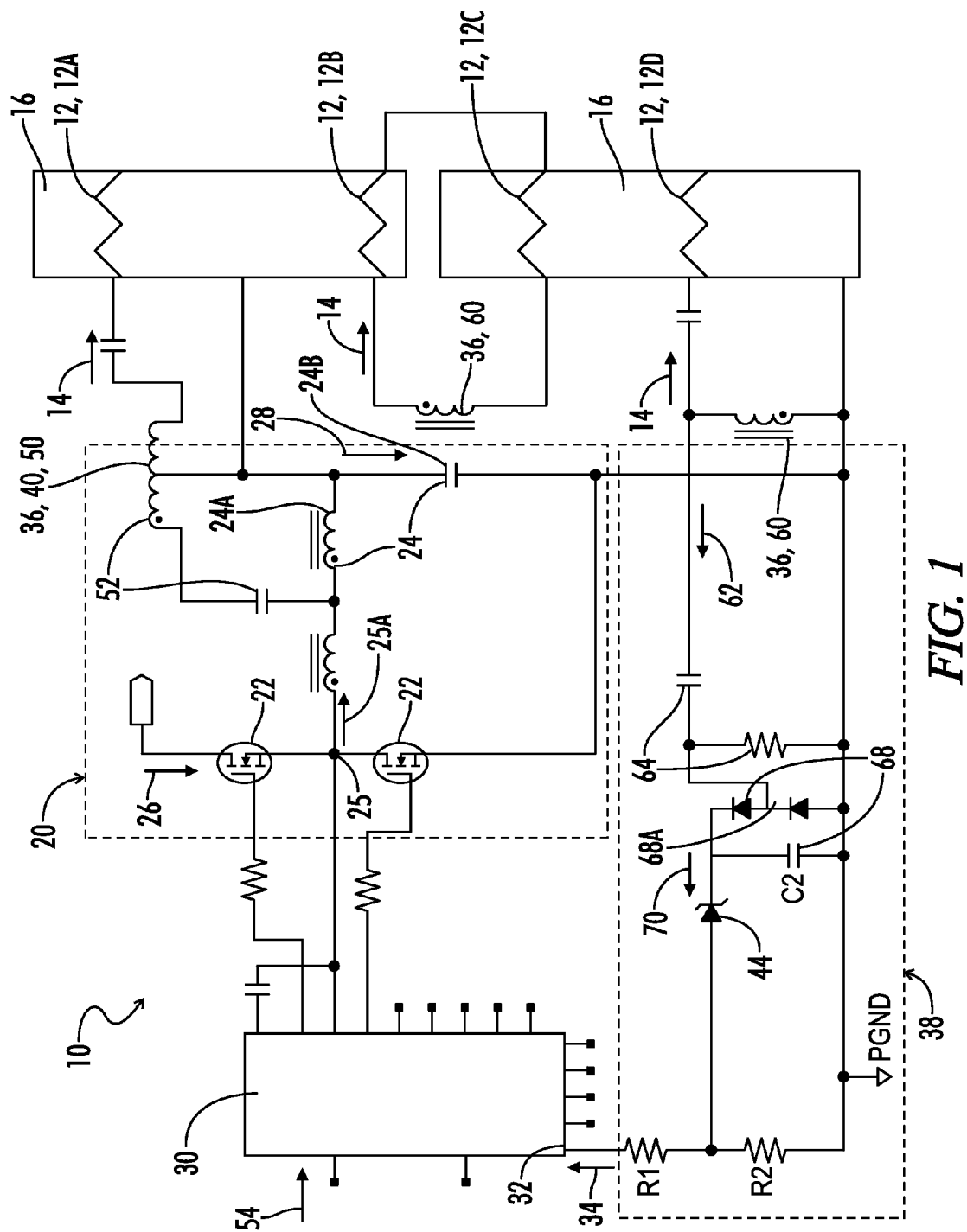
FIG. 1 is a schematic of one embodiment of a ballast circuit having a control loop in accordance with the invention.

Referring now to FIG. 1, a ballast circuit 10 in accordance with the present invention is shown. The ballast circuit 10 has an inverter 20 which in FIG. 1 is arranged in a half-bridge inverter topology. However, it should be understood that the invention may be embodied in other inverter circuits and may be used with any type of gas discharge lamp 16. The invention reduces a filament heating voltage 14 below a desired maximum voltage level. A half-bridge inverter topology is illustrated because this inverter topology is commonly used to power high-impedance gas-discharge lamps 16.

Lamps 16 are particularly sensitive to unbalanced filament currents and over-current pin problems caused when the filament heating voltage 14 heats the lamp filaments 12 during lamp dimming. The present invention is useful in reducing these effects. In addition, the invention may be utilized with lamps that are not high impedance gas discharge lamps 16.

Inverter 20 receives a DC voltage 26 at V_rail and converts the DC voltage 26 into an AC voltage 28 that powers the lamps 16. Inverter 20 utilizes an inverter controller 30, inverter switch devices 22, and an inverter resonant circuit 24 that includes a resonant inductive component, 24A, and a capacitive resonant component 24B. Inverter resonant circuit 24 may be tuned to the appropriate frequency for powering the gas discharge lamps 16. In this particular embodiment, the inverter resonant circuit 24 is coupled between the inverter switches 22 at terminal 25. As is known in the art, inverter switches 22 are switched at a switching frequency to generate a pulsed voltage 25A. Inverter resonant circuit 24 then filters the pulsed voltage 25A to provide an AC voltage 28 at the appropriate frequency for powering the gas discharge lamps 16.

Ballast circuit 10 may be operable to pre-heat the lamp filaments 12 prior to filament ignition and/or to dim the lamps 16 in accordance with a desired dimming level. In either case, the lamp filaments 12 are heated by a filament heating voltage 14. However, the filament heating voltage 14 may reach excessively high levels when heating the filaments 12. This may damage the lamps 16 and cause unbalanced filament currents and overcurrent pin problems when the lamps 16 are being dimmed. The invention reduces a voltage level of the filament heating voltage 14 below a desired maximum voltage level during the pre-heat period and/or during dimming to reduce these problems.

In this embodiment, the lamp filaments 12 are connected in series. A filament heating component 40 is coupled to the inverter resonant inductive component 24A to receive a filament heating voltage 14 from the inverter 20. The filament heating component 40 may be a primary transformer winding 50 in filament heating transformer 36. Primary transformer winding 50 is connected to lamp filament 12A and provides the filament heating voltage 14 to this lamp filament, 12A. Primary transformer winding 50 may also be magnetically coupled to secondary windings 60 which receive filament heating voltage 14 to heat the lamp filaments 12B, 12C.

During a pre-heat period, the inverter controller 30 may operate in accordance with a pre-heat sequence to pre-heat the lamp filaments 12. Because the filament heating voltage 14 in this embodiment is received from the inverter resonant circuit 24, the filament heating voltage 14 is associated with the AC voltage 28. Consequently, the switching frequency of the inverter switch devices 22 also determines the signal frequency of the filament heating voltage 14.

Figure 2:
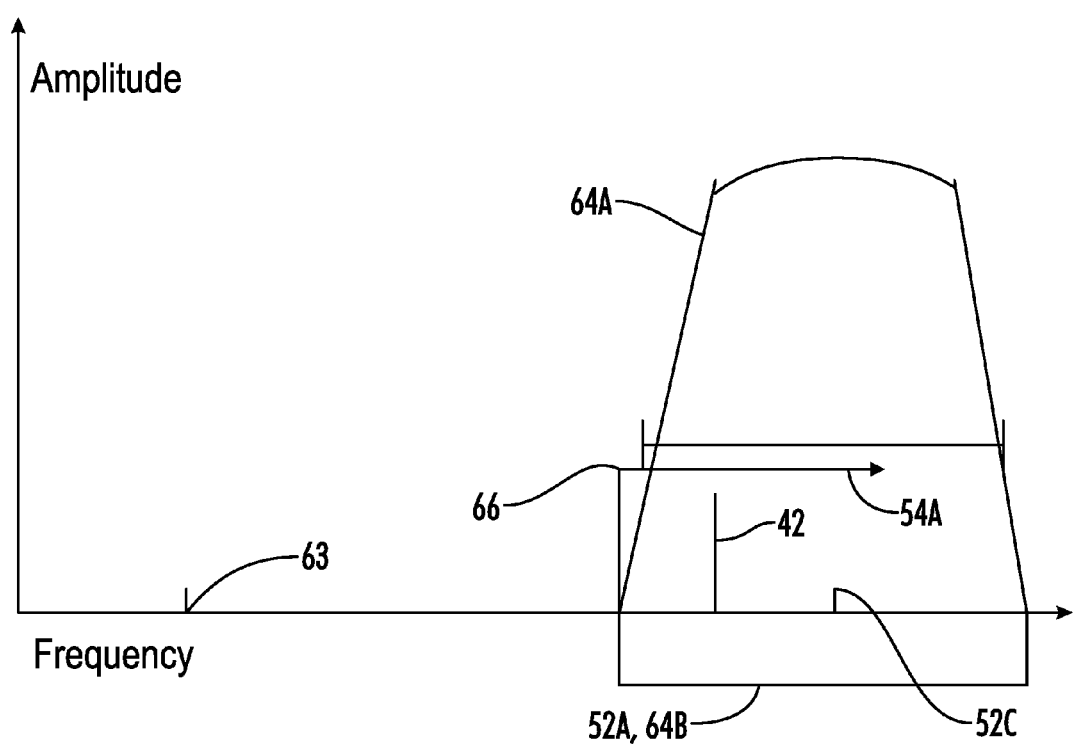
FIG. 2 is a frequency domain graph of the relevant signals and response curves associated with the ballast circuit shown in FIG. 1.

Referring now to FIGS. 1 and 2, primary resonant winding 50 of filament heating transformer 36 may also be part of a filament resonant tank 52. Inverter controller 30 operates the filament heating voltage 14 within a pre-heat frequency range 48 during the pre-heat period. Pre-heat frequency range 48 is normally much higher than the frequency of operation during steady state. The frequency response bandwidth 52A of the filament resonant tank 52 passes the filament heating voltage 14 operating at the pre-heat frequency range 64B. However, the filament heating voltage 14 is blocked at frequencies near the inverter resonant frequency 24C of the inverter resonant circuit 24. In this manner, the filament heating voltage 14 is coupled to the lamp filaments 12 during the pre-heat period but blocked during full-lamp operation. This helps balance the filament currents and reduce overcurrent pin problems during full lamp operation after the pre-heat period.

Ballast circuit 10 may be a dimmable ballast and thus be operable to operate the lamps 16 at one or more dimming levels. Inverter controller 30 may receive a dimming control signal 54 indicating a desired dimming level for the lamps 16 and adjust the switching frequency of the inverter switch devices 22 in accordance with this desired dimming level. Typically, the switching frequency during lamp dimming is significantly higher than during full-lamp operation. At low dimming levels, the lamp current may be relatively low and thus may require that the lamp filaments 12 be heated to maintain the lamp filaments 12 at the appropriate temperature. The frequency response bandwidth 52A of the filament resonant tank 52 may also be tuned to receive the filament heating voltage 14 at some or all of these dimming frequencies.

One of the problems with the resonant devices 24, 52 of the ballast circuit 10 is that the electrical component values have a high level of variability. Given the high Q of resonant devices 24, 52, this may lead to excessively high filament heating voltages 14 during the pre-heat period and/or during lamp dimming. Accordingly, a control loop 38 is utilized to reduce the filament heating voltage 14 below a desired maximum voltage level. Other embodiments of the control loop 38 may be utilized to reduce the filament heating voltage 14 during other lamp conditions, as the invention may be utilized any time the filament heating voltage 14 needs to be maintained below a desired maximum voltage level.

In this embodiment, control loop 38 is connected to a feedback terminal 32 in inverter controller 30 and receives a feedback control signal 62 associated with a voltage level of the filament heating voltage 14 from the filament heating component 40. Filament heating component 40 may be any component that receives the filament heating voltage 14 or a signal associated with the filament heating voltage 14. In this case, feedback control signal 62 is the filament heating voltage 14 itself. A single lamp application of ballast circuit 10 may receive the filament heating voltage 14 on a winding magnetically coupled to the inverter inductive component 24A. In other embodiments, filament control signal 62 may not be the filament heating voltage 14 itself and may be indirectly related to the voltage level of the filament heating voltage 14.

In this embodiment, the feedback control signal 62 may be the same as the filament heating voltage 14 received on secondary winding 60 coupled to lamp filament 12D. It should also be understood however that filament heating voltage 14 may be at different voltage levels at each individual lamp filament, 12A, 12B, 12C, 12D. Thus, the voltage level at filament resonant winding 50 may be different than the voltage level at secondary winding 60 coupled to the lamp filament 12D. Any of these voltage levels may be used to operate the control loop 38. Also, the value of the desired maximum voltage level may be dependent upon where the voltage level of the filament heating voltage 24 is being measured. While these voltage levels may be different, all of them change in accordance with a change in the amount of power transmitted by the filament heating voltage 14. Feedback control signal 62 is associated with the filament heating voltage 14 because its signal level also changes in accordance with changes in the amount of power transmitted by the filament heating voltage 14.

As inverter controller 30 changes the switching frequency of the inverter switch devices 22, a voltage level of the filament heating voltage 14 also changes. Response curve 64A of filament resonant tank 52 may be shaped such that as the signal frequency 42 of the filament heating voltage 14 is moved away from a center frequency 52C of the response curve 64A, the voltage level of the filament heating voltage 14 is lowered. Center frequency 52C is generally the resonant frequency of the filament resonant tank 52 and may be the associated with a pre-heat frequency for powering the lamps 16. This response curve, 64A, may be shaped so that the filament heating voltage 14 has desired voltage levels at different stages of the pre-heat period and/or at designated dimming levels. In addition, response curve 64A is also shaped so that filament heating voltage 14 is received within the pre-heat and/or dimming frequency signal ranges 64B of filament heating voltage 14 but is blocked at the frequency 63 of the filament heating voltage 14 during full-lamp operation.

Control loop 38 may have a high pass filter 64 with a response curve 54A that has a corner frequency 66 at or near the edge of pre-heat and/or dimming frequency signal ranges 64B. In this case, feedback control signal 62 is AC. As the signal frequency 42 of the filament heating voltage 14 is lowered as the voltage level of the feedback control signal 62 is also lowered. Once the feedback control signal 62 is outside the pre-heat and/or dimming frequency signal ranges 64B, feedback control signal 62 is filtered out by high pass filter 64 and control loop 38 does not operate during full lamp operation.

Referring again to FIG. 1, during the pre-heat period and/or lamp dimming, control loop 38 is operable to generate an overvoltage control signal 34 if the filament heating voltage 14 is above a desired maximum voltage level. Inverter controller 30 responds to reduce the overvoltage control signal 34 by adjusting the switching frequency of inverter switch device 22. In this embodiment, this adjusts the signal frequency 42 of the filament heating voltage 14 and thus places the signal frequency 42 at a different position on the response curve 64A of the filament resonant tank 52. In turn, this lowers the voltage level of the filament heating voltage 14. The inverter controller 30 may continue to adjust the switching frequency until the overvoltage control signal 34 has been eliminated.

Overvoltage control signal 34 may therefore be generated when the voltage level of the filament heating signal 14 is at or above a desired maximum voltage level. As mentioned above, the voltage level of the filament heating voltage 24 in this control loop 38 is the voltage across secondary winding 60 associated with heating lamp filament, 12D. After feedback control signal 62 is filtered by high pass filter 64, the feedback control signal 62 may be received by a converter 68. Converter 68 converts feedback control signal 62 from AC into a pulsed DC control signal 70. In this embodiment, the converter 68 is a half-wave rectifier 68A coupled to a capacitor C2. Only one half-cycle of the feedback control signal 62 is transmitted through the half-wave rectifier 68A. These half-cycles are then smoothed out by capacitor C2 to form the pulsed DC control signal 70.

Pulsed DC control signal 70 may provide a voltage across the voltage regulator 44 in the control loop 38. So long as the voltage level of the pulsed DC control signal 70 is below an activation voltage level of the voltage regulator 44, the voltage regulator 44 does not transmit and no overvoltage regulation signal 34 is generated. However, once the voltage level of the pulses of the pulsed DC control signal 70 are at or above the activation voltage level, an overvoltage control signal 34 is generated. Thus, the activation voltage level of the voltage regulator 44 should be selected based on the desired maximum voltage level of the filament heating voltage 14. In this embodiment, the voltage regulator 44 is a reverse biased Zener diode and the breakdown voltage of the Zener diode corresponds with the desired maximum voltage level of the filament heating voltage 14.

Inverter controller 30 may be any type of control circuit utilized to control the switching frequency of an inverter switch device. In this embodiment, inverter controller 30 is an IC control chip, specifically the UBA2014 driver chip. The circuit can take advantage of the characteristics of the chip to generate the overvoltage control signal 44 from the pulsed DC control signal 70. To do this, a bootstrapped component R1 is coupled to the feedback terminal 32 of the inverter controller 30. Bootstrapped component R1 converts the output of the voltage regulator 44 into a smooth DC signal.

A bootstrapped component R1 is simply a component in which both the input and output of the component are driven substantially in unison. Of course, practical limitations prevent the inputs and outputs of a bootstrapped component R1 to be driven in perfect unison. However, bootstrapping techniques are known for approximating this effect. In this example, the bootstrapped component R1 is a resistor coupled to a second resistor R2 which is also connected to ground. When the voltage regulator 44 is activated, current is fed to resistor R2. Because resistor R1 is coupled to the chip, this raises the voltage on both sides of bootstrapped component R1. Overvoltage control signal 34 is thus generated as a smooth DC signal. As the filament heating voltage 14 is lowered by the inverter controller 30, the overvoltage control signal 34 is also lowered in a smooth fashion until the overvoltage control signal 34 is eliminated and the filament heating voltage 14 is below the desired maximum voltage level.

Thus, although there have been described particular embodiments of the present invention of a new and useful BALLAST CIRCUIT FOR A GAS DISCHARGE LAMP WITH A CONTROL LOOP TO REDUCE A FILAMENT HEATING VOLTAGE BELOW A MAXIMUM HEATING LEVEL it is not intended that such references be construed as limitations upon the scope of this invention except as set forth in the following claims.

What is claimed is:

1. A ballast circuit capable of reducing a filament heating voltage below a desired maximum voltage level when heating a lamp filament of a gas-discharge lamp, comprising:
    an inverter having at least one inverter switch device for converting a DC voltage into an AC voltage to power the gas discharge lamp;
    an inverter controller operable to control a switching frequency of the inverter switch device, the inverter controller having a feedback terminal for receiving an overvoltage control signal and being responsive to adjust the switch frequency of the inverter switch device to reduce a signal level of the overvoltage control signal;
    a filament heating component coupled to the inverter to receive the filament heating voltage, the filament heating component comprising a filament heating winding; and
    a control loop operably associated with the filament heating component and the feedback terminal of the inverter controller, the control loop including
        a voltage regulator that is operable to cause the transmission of the overvoltage control signal when a voltage level of the filament heating voltage is at or above the desired maximum voltage level,
        a secondary winding magnetically coupled to the filament heating winding to receive a feedback control signal associated with the filament heating voltage, and
        a high pass filter coupled between the voltage regulator and the secondary winding, the high pass filter having a corner frequency selected such that the feedback control signal is blocked during steady state operation.

2. The ballast circuit of claim 1, wherein the voltage regulator has an activation voltage level related to the desired maximum voltage level of the filament heating voltage.

3. The ballast circuit of claim 1, wherein a signal frequency of the filament heating voltage is associated with the switching frequency of the inverter switch device.

4. The ballast circuit of claim 1, wherein the inverter includes an inverter resonant circuit having a resonant inductive component, the filament heating winding being coupled to the resonant inductive component.

5. The ballast circuit of claim 2, wherein the voltage regulator comprises a reverse biased Zener diode and the activation voltage level is a breakdown voltage level of the reverse biased Zener diode.

6. The ballast circuit of claim 3, further comprising:
the signal frequency of the filament heating voltage being within a pre-heat frequency range during a pre-heat period; and
a filament resonant tank that includes the filament heating winding, the filament resonant tank being tuned to a pre-heat frequency that is within the pre-heat frequency range.

7. The ballast circuit of claim 3, further comprising:
the inverter controller being operable to adjust the switching frequency in accordance with a dimming level of the gas-discharge lamp; and
a filament resonant tank that includes the filament heating winding, the filament resonant tank being tuned to a dimming frequency of the filament heating voltage associated with the dimming level.

8. A ballast circuit capable of reducing a filament heating voltage below a desired maximum voltage level when heating a lamp filament of a gas-discharge lamp, comprising:
an inverter having at least one inverter switch device for converting a DC voltage into an AC voltage to power the gas discharge lamp;
an inverter controller operable to control a switching frequency of the inverter switch device, the inverter controller having a feedback terminal for receiving an overvoltage control signal and being responsive to adjust the switch frequency of the inverter switch device to reduce a signal level of the overvoltage control signal;
a filament heating component coupled to the inverter to receive the filament heating voltage, the filament heating component comprising a filament heating winding; and
a control loop operably associated with the filament heating component and the feedback terminal of the inverter controller, the control loop including
a secondary winding magnetically coupled to the filament heating winding to receive a feedback control signal associated with the filament heating voltage;
a pulse peak detector operable to convert the feedback control signal into a DC control signal;
a voltage regulator that is operable to cause the transmission of the overvoltage control signal when a voltage level of the filament heating voltage is at or above the desired maximum voltage level, the voltage regulator having an activation voltage level associated with the maximum desired voltage level of the filament heating signal; and
a bootstrapped component operably associated with the voltage regulator and the feedback terminal of the inverter controller, the bootstrapped component being responsive to generate the overvoltage control signal when a voltage level of the DC control signal is at or greater than the activation voltage level.

9. The ballast circuit of claim 8, wherein a signal frequency of the filament heating voltage is associated with the switching frequency of the inverter switch device.

10. The ballast circuit of claim 8, wherein the voltage regulator comprises a reverse biased Zener diode having a breakdown voltage level related to the desired maximum voltage level of the filament heating voltage.

11. The ballast circuit of claim 9, further comprising:
the signal frequency of the filament heating voltage being within a pre-heat frequency range during a pre-heat period; and
a filament resonant tank that includes the filament heating winding, the filament resonant tank being tuned to a pre-heat frequency that is within the pre-heat frequency range.

12. The ballast circuit of claim 9, further comprising:
the inverter controller being operable to adjust the switching frequency in accordance with a dimming level of the gas-discharge lamp; and
a filament resonant tank that includes the filament heating winding, the filament resonant tank being tuned to a dimming frequency of the filament heating voltage associated with the dimming level.

13. A method of reducing a filament heating voltage below a desired maximum voltage level when heating a lamp filament of a gas-discharge lamp, comprising:
receiving the filament heating voltage that heats the lamp filament from a filament resonant tank coupled to an inverter having at least one inverter switch device for converting a DC voltage into an AC voltage;
providing a voltage across a voltage regulator that is at or greater than a activation voltage level when the filament heating voltage is at or above the desired maximum voltage level;
generating an overvoltage control signal when the voltage across the voltage regulator is at or greater than the activation voltage level; and
adjusting a switching frequency of the inverter switch device in accordance with a dimming signal of the gas-discharge lamp to reduce a signal level of the overvoltage control signal, wherein the filament resonant tank has a frequency response bandwidth that is within a signal frequency of the filament heating voltage associated with the dimming level.

14. The method of claim 13, further comprising blocking the filament heating voltage from the inverter during full-lamp operation.

15. The method of claim 13, wherein the voltage regulator comprises a reverse biased Zener diode and the activation voltage level is a breakdown voltage of the reverse biased Zener diode.

16. The method of claim 13, wherein a signal frequency of the filament heating voltage is associated with the switching frequency of the inverter switch device.

17. The method of claim 13, wherein the filament resonant tank is tuned to a pre-heat frequency that is within a pre-heat frequency range for the filament heating voltage during a pre-heat period.

18. The method of claim 13, further comprising receiving a feedback control signal associated with the voltage level of the filament heating voltage at a secondary winding magnetically coupled to a resonant inductive component in the filament resonant tank.

19. The method of claim 13, further comprising:
converting the feedback control signal to a DC control signal wherein the voltage across the voltage regulator is associated with the DC control signal; and
bootstrapping the DC control signal to generate the overvoltage control signal.

20. The method of claim 14, further comprising:
after the pre-heat period, adjusting the switching frequency of the inverter switch device so that the gas-discharge lamp operates at a dimming level; and
receiving the filament heating voltage when the lamp is operating at the dimming level.

\* \* \* \* \*